UNITED STATES PATENT OFFICE.

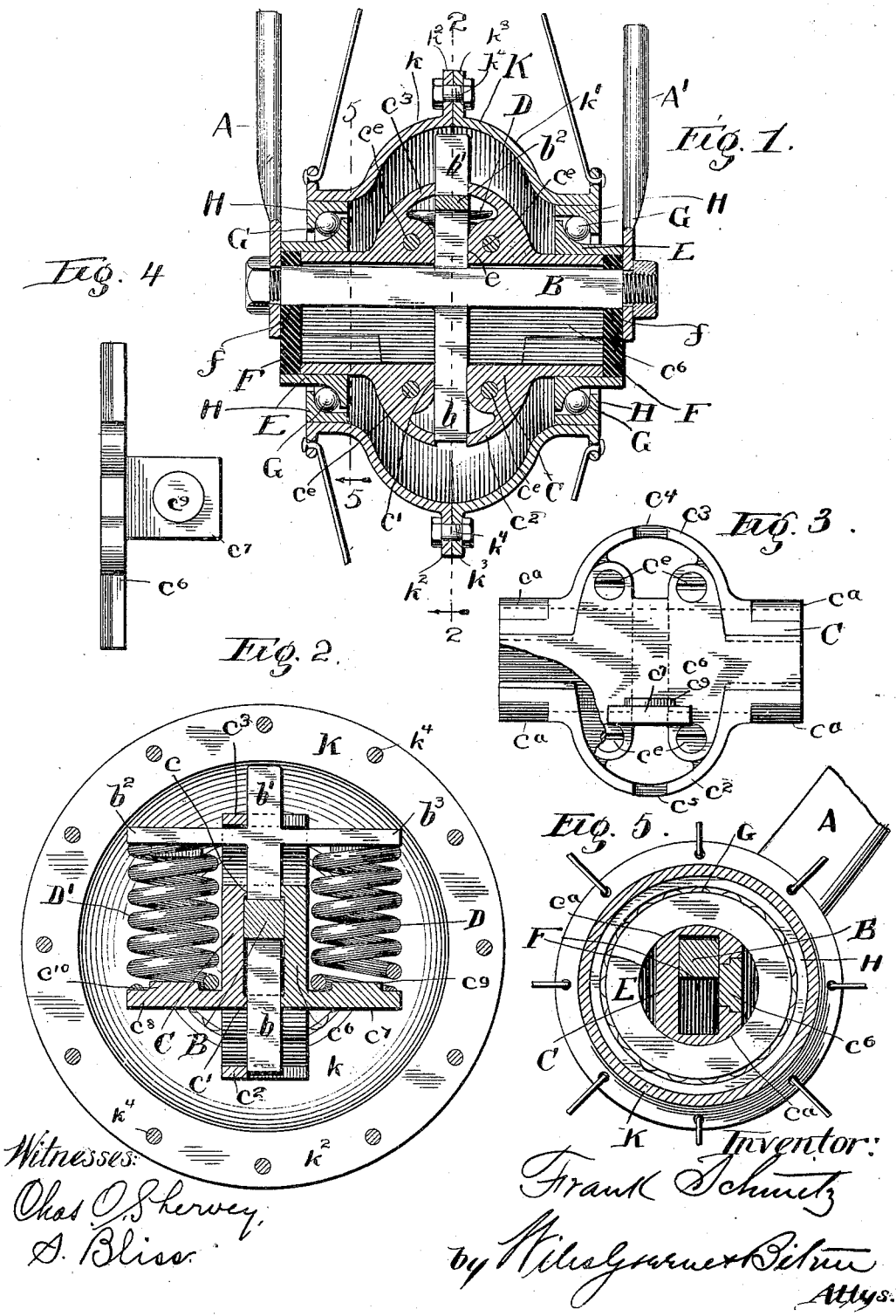

FRANK SCHMITZ, OF CHICAGO, ILLINOIS.

BICYCLE HUB AND AXLE.

SPECIFICATION forming part of Letters Patent No. 656,905, dated August 28, 1900.

Application filed September 18, 1899. Serial No. 730,308. (No model.)

*To all whom it may concern:*

Be it known that I, FRANK SCHMITZ, a citizen of the United States of America, residing at Chicago, in the county of Cook and State of Illinois, have invented certain new and useful Improvements in Bicycle Hubs and Axles, of which the following is a specification.

My invention relates to certain improvements in bicycle hubs and axles, designed to produce a neat, compact, and durable hub.

The invention consists in certain novel characteristics pertaining to the form, construction, and arrangement of the hub and axle and certain parts used in connection therewith.

The preferred form of my improvements will be described specifically for the purpose of clearly setting forth the invention; but I do not limit myself to said preferred form, the essential features thereof being pointed out in the appended claims.

In the drawings, Figure 1 is a vertical longitudinal section of a hub and axle. Fig. 2 is a vertical transverse section in line 2 2 of Fig. 1 looking in the direction of the arrow 2. Fig. 3 is a side elevation of the axle-box. Fig. 4 is a plan view of the removable side plate of the axle-box, and Fig. 5 is a vertical transverse section in line 5 5 of Fig. 1 looking in the direction of the arrow 5.

Referring to the figures, A A' are intended to represent the arms of the front fork of a bicycle, between which is secured the axle B, which has a downwardly-extending bar $b$, preferably at its middle, and at the same place an upwardly-extending bar $b'$, the latter bearing horizontal oppositely-extending arms $b^2 b^3$. An axle-box C is made of proper internal size to receive the axle and permit it to move up and down. This box is open at its ends and at its middle portion is provided with suitable guide-openings $c c'$ to receive and guide the vertical arms of the axle, and yokes $c^2 c^3$ are also preferably provided in the plane of the axle, having guides $c^4 c^5$ to hold the vertical arms of the axle against horizontal oscillation, especially transverse to the wheel. The yoke $c^3$ acts as a stop to limit the upward movement of the horizontal arms $b^2 b^3$ of the axle. Upon one side of the box is a detachable plate $c^6$, secured by screws $c^e$, providing easy means for the insertion and removal of the axle. Upon this plate and upon the box are horizontally-disposed arms $c^7 c^8$, preferably provided with spring-seats $c^9 c^{10}$, between which and the horizontal arms of the axle are confined compression-springs D D'.

The ends of the axle-box have rounded corners $c^a$, and upon these ends are secured the cones E of the bearing. The cones preferably extend beyond the axle-box and contain elastic washers F, having central openings $f$, fitted to the axle and designed to both close the ends of the axle-box and act as bumpers to prevent clicking or jarring of the axle in the box. In the drawings the axle is shown as forced upward by the springs D D'. For this reason the elastic washers are distorted, bringing the openings above the center. Antifriction-balls G run between the cones E and cups H, secured in the ends of the hub K. This hub is preferably made up of two symmetrical shells $k k'$, having circumferential flanges $k^2 k^3$, secured together, as by bolts $k^4$. In form it is preferably larger at the middle portion than at the bearings to accommodate the parts within. The weight is supposed to rest upon the axle, from which it is transmitted to the springs resting upon the axle-box, which is supported by the bearings of the hub. Any jolt or jar is taken up by the springs D D' instead of being transmitted to the load upon the axle.

More or less variation in the construction is possible without departing from the principle of the invention.

I claim as new and desire to secure by Letters Patent—

1. The combination of the axle, B, having the vertical arms, $b$, $b'$, and the horizontal arms, $b^2$, $b^3$, the axle-box, provided with guides for the axle and having the horizontal arms, $c^7, c^8$, and the springs, D, D', interposed between the horizontal arms of the axle-box and axles respectively; substantially as described.

2. In a device of the class described, the combination of a hub, an axle-box journaled therein, a vertically-movable axle within the axle-box, a spring between the axle and the axle-box and a vertical arm secured to the axle and guided in the axle-box, whereby relative oscillation of the axle and axle-box in a vertical plane is prevented; substantially as described.

3. The combination with the axle, B, having the vertical arms, $b$, $b'$, of the axle-box, C, containing guides for said arms, a spring interposed between the axle-box and the axle and the removable plate, $c^6$, forming one of the walls of said guides; substantially as described.

4. The combination with the axle, B, having the vertical arms, $b$, $b'$, of the axle-box, C, having the yokes, $c^2$, $c^3$, containing guides for said arms and a suitable spring interposed between the axle-box and the axle; substantially as described.

In witness whereof I have hereunto set my hand, at Chicago, in the county of Cook and State of Illinois, this 11th day of September, A. D. 1899.

FRANK SCHMITZ.

Witnesses:
CHAS. O. SHERVEY,
S. BLISS.